United States Patent [19]

Sato et al.

[11] Patent Number: 4,626,897

[45] Date of Patent: Dec. 2, 1986

[54] OPTICAL FILTER FOR COLOR IMAGING DEVICE

[75] Inventors: Masanori Sato, Katsuta; Shusaku Nagahara, Hachioji; Kenji Takahashi, Kodaira, all of Japan

[73] Assignee: Hitachi, Ltd., Tokyo, Japan

[21] Appl. No.: 494,449

[22] Filed: May 13, 1983

[30] Foreign Application Priority Data

May 17, 1982 [JP] Japan .................................. 57-81412

[51] Int. Cl.⁴ ...................... H04N 9/077; H04N 9/07; G02B 5/30; G02B 27/28
[52] U.S. Cl. ........................................ 358/44; 358/55; 350/401; 350/404
[58] Field of Search ............... 350/400, 401, 404, 405, 350/408; 358/55, 44, 41, 43, 47, 48

[56] References Cited

U.S. PATENT DOCUMENTS

| | | | |
|---|---|---|---|
| 3,588,224 | 6/1971 | Pritchard | 350/404 |
| 3,756,691 | 9/1973 | Pasold | 350/405 |
| 3,784,734 | 1/1974 | Watanabe et al. | 358/55 |
| 3,936,147 | 2/1976 | Murakami | 350/404 |
| 4,227,208 | 10/1980 | Takanashi et al. | 358/55 |
| 4,246,601 | 10/1981 | Sato et al. | 358/44 |
| 4,318,123 | 3/1982 | Knop | 358/44 |
| 4,417,272 | 11/1983 | Inoue et al. | 358/44 |
| 4,539,584 | 9/1985 | Otake | 358/44 |
| 4,548,479 | 10/1985 | Yeh | 350/404 |
| 4,575,193 | 3/1986 | Greivenkamp, Jr. | 358/55 |

FOREIGN PATENT DOCUMENTS

| | | | |
|---|---|---|---|
| 18689 | 6/1972 | Japan . | |
| 105221 | 8/1980 | Japan | 358/44 |
| 39683 | 3/1982 | Japan | 358/44 |
| 14817 | 1/1983 | Japan | 358/43 |

OTHER PUBLICATIONS

Drewery, J. O., "The Zone Plate as a Television Test Pattern", SMPTE Journal, vol. 88, Nov. 1979, pp. 763-770.

Bennett et al., "Handbook of Optics", Aug. 31, 1981, pp. 10-153 to 10-154.

Lu et al., "Depolarization of White Light by a Birefringent Crystal", vol. 65, No. 3, (Mar. 1975), pp. 248-251.

*Primary Examiner*—James J. Groody
*Assistant Examiner*—Randall S. Svihla
*Attorney, Agent, or Firm*—Antonelli, Terry & Wands

[57] ABSTRACT

A spatial frequency filter apparatus for suppressing spurious signals of the type generated in a color television camera incorporating a mosaic color encoding filter for multiplexing color signals includes two double refraction plates for filtering natural light introduced through a lens system in both the horizontal and vertical directions and an optical plate, such as a quarter wavelength plate or a rotatory polarization plate, interposed between the two double refraction plates. By causing natural light to transmit through the two double refraction plates and the optical plate before being introduced to the mosaic color encoding filter, the spurious signals are suppressed, whereby false color which may otherwise make an appearance at the contours of an image picked up by the color television camera can be significantly reduced.

11 Claims, 7 Drawing Figures

OPTICAL FILTER FOR COLOR IMAGING DEVICE

The present invention relates generally to an optical system for a television camera and more particularly to an optical system for a color solid state imaging device provided with a mosaic color-encoding filter.

In the first place, generation of spurious signals in a striped color pickup-tube camera as well as means for suppressing the spurious signals will be described.

The striped color pick-up tube or camera is provided with a striped color-encoding filter. An example of the conventional striped color-encoding filter is shown in FIG. 1 at (a). This filter is composed of stripes of the three primary colors, i.e., red (R), green (G) and blue (B), interleaved so that color encoding or modulation is effected only in the horizontal direction in the plane in FIG. 1. Accordingly, when such a striped color-encoding filter is used, there is produced a spurious color signal due to the beat occurring between the spatial frequency of scanning in the horizontal direction and the frequency of stripe repetition based on the pitch of the stripes of the color-encoding filter.

Describing generation of the spurious color signal, reference is made to FIG. 1 at (b) which shows an object of a horizontal array of black and white stripes having a spatial frequency repeated with the same pitch as that of the color encoding filter shown at (a). When the black and white stripes are picked up through the filter shown at (a) in FIG. 1, the signal component corresponding to the red (R) stripe is always produced at a high level, while the output signal components corresponding to the stripes G and B are at a low level. As a consequence, the image produced on a monitor is colored in red at its contours notwithstanding the fact that the object being picked up is a black and white stripe pattern. This signal component R constitutes the spurious signal which contributes to generation of false color at the contour of the image (also referred to as color moiré), deteriorating remarkably the picture quality.

As an attempt to eliminate the spurious signal, there has heretofore been employed a spatial frequency filter constituted by a double refraction plate, such as a quartz crystal plate or the like. This spatial frequency filter is so designed as to restrict or suppress the spatial frequency which generates the beat in cooperation with the pitch of the color-encoding filter. The quartz crystal filter has a response function R (f) which is given by the following expression (1):

$$R(f) = \left| \cos\left(\frac{\pi}{2} \cdot \frac{f}{f_0}\right) \right| \tag{1}$$

where f represents the spatial frequency, and $f_0$ represents a trap frequency which is variable in dependence on the thickness of the quartz crystal plate.

As another spatial frequency filter, there is disclosed in Japanese Utility Model Publication No. 47-18689 a filter structure in which a plurality of double refraction plates are employed. Additionally, a spatial frequency filter which includes a quarter wavelength plate interposed between a pair of double refraction plates is disclosed in Japanese Examined Patent Publication (Kokoku) No. 51-14033.

The known measures mentioned above are certainly effective to a satisfactory degree for suppressing the spurious color signal generated in conjunction with the use of the color encoding filter in which the color is modulated or encoded only in the horizontal direction as in the case of the striped color-encoding filter used in the color television camera and the like.

On the other hand, a mosaic color-encoding filter is also employed in a solid state image device for effecting color modulation (encoding) not only in the horizontal direction but also in the vertical direction with a view to attaining a higher resolution with a limited number of the picture elements while suppressing or reducing the aforementioned color moiré (i.e., generation of false color at the contours).

In the following, elucidation will be made of the color modulation in both the horizontal and vertical directions by using a mosaic color-encoding filter shown in FIG. 2 and the reason why the spurious signal can not be suppressed with the aid of the spatial frequency filter mentioned above. The mosaic color encoding filter exemplarily shown in FIG. 2 includes dots colored in white (W), yellow (Ye), cyan (Cy) and green (G). With such mosaic color-encoding filter, the red (R) signal component and the blue (B) signal component are decoded through arithmetic operations performed in accordance with the following expressions:

$$R = W + Ye - Cy - G \tag{2}$$

$$B = W + Cy - Ye - G \tag{3}$$

When the demodulation of the red (R) component in accordance with the expression (2) is considered in association with the dot array of the color-encoding filter shown in FIG. 2, it will be seen that the R component can be arithmetically determined by subtracting a sum of two signals derived from the adjacent dots W and Ye arrayed in an inclined direction from a sum of signals originating in the adjacent dots Cy and G also arrayed in the inclined direction. This means that decoding of the R signal is effected in both the horizontal and the vertical directions.

In this way, when the mosaic color-encoding filter is used, two spurious signal components will take part in the arithmetic operation for color demodulation; one is ascribable to the beat between the pitch of dot repetition and the spatial frequency of scanning on the image plane in the horizontal direction of the color-encoding filter and the other is due to the beat between the pitch of dot repetition and the spatial frequency of scanning on the image plane in the vertical direction. Such being the circumstance, the known spatial frequency filter designed to deal with the spurious signal only in the horizontal direction described above is not effective to suppress both the spurious signals produced in connection with the use of the mosaic color-encoding filter, which is a disadvantage.

With the foregoing in mind, it is an object of the present invention to provide a spatial frequency filter which is capable of suppressing spurious signals generated in an optical system for a solid state imaging device provided with a color encoding filter.

In view of the object mentioned above, there is proposed according to a feature of the invention a spatial frequency filter which is imparted with filter functions in both the horizontal and vertical directions to suppress those spatial frequencies which give rise to generation of the spurious signals in either of the horizontal or vertical directions. To this end, it is proposed that an optical plate, such as a quarter wavelength plate or a rotatory polarization plate be disposed between a pair of double refraction plates, which are so disposed that they are operative in different directions (i.e., directions in which images of incident light are produced by each of the double refraction plates which differ from one another).

The above and other objects, features and advantages of the present invention will be apparent when reading the following description of the preferred embodiment of the invention taken in conjunction with the accompanying drawings, in which.

Now, the invention will be described in detail in conjunction with an exemplary embodiment shown in FIG. 3. The spatial frequency filter shown in this figure includes double refraction plates 1 and 2 disposed with such orientation that the images of incident light produced by them are deviated in different directions and a quarter wavelength plate 3 interposed between the double refraction plates 1 and 2.

Figure 3:
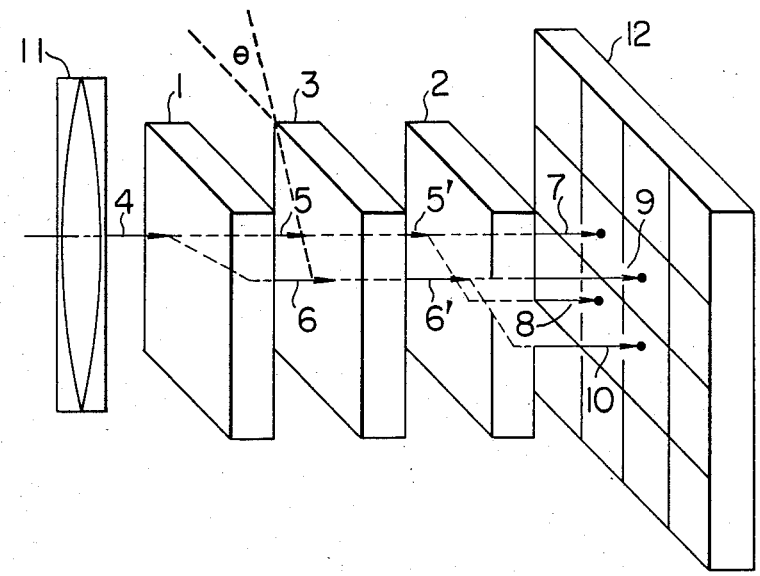
FIG. 3 is a view showing a structure of a spatial frequency filter according to an embodiment of the present invention.

First, description is made about the double refraction plate by referring to FIG. 3. Incident natural light 4 impinging on the double refraction plate 1 through a lens system 11 is divided into two light rays, one of which is a linearly polarized light ray (ordinary ray) 5 vibrating in the direction perpendicular to the optical axis, and the other of which is a linearly polarized light ray (extraordinary ray) 6 vibrating in the direction parallel to the optical axis. The double refraction plate 1 exhibits different refractive indexes to the ordinary light ray 5 and the extraordinary light ray 6 which thus travel along two different optical paths, respectively, to form two images.

The ordinary ray and the extraordinary ray are linearly polarized rays having respective planes of polarization intersecting perpendicularly to each other. The ratio of intensity between the extraordinary ray and the ordinary ray relative to the natural light ray is 1:1. This is because natural light is a set of linearly polarized rays oriented in various directions.

Next, the quarter wavelength plate will be described. This plate is an optical plate which is made of a plastic material or the like and serves to delay a light ray about a quarter of the wavelength thereof. The quarter wavelength plate is effective for converting the linearly polarized light to elliptically polarized light. When an angle $\theta$ formed between the vibrating plane of the linearly polarized light ray and the optical axis of the quarter wavelength plate is 45°, the linearly polarized light is converted to circularly polarized light as a particular case of the elliptically polarized light. Thus, in the structure shown in FIG. 3, the ordinary ray 5 and the extraordinary ray 6 both of which are linearly polarized light are converted through the quarter wavelength plate 3 into circularly polarized lights 5' and 6' which are out of phase by 90° with each other.

Figure 4:
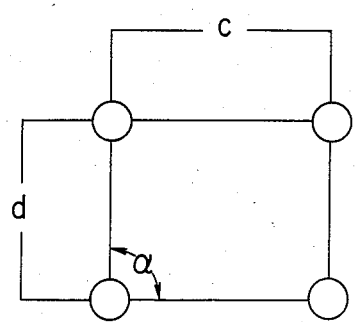
FIG. 4 is a view showing a quadruple image produced through the spatial frequency filter.

The action of the double refraction plate to circularly polarized light is equivalent to the action to the linearly polarized light. Accordingly, the circularly polarized light 5' is split by the double refraction plate 2 into ordinary light 7 and extraordinary light 8 which have an intensity equal to each other. Similarly, the circularly polarized light 6' is split into an ordinary light ray 9 and an extraordinary light ray 10. Thus, there are formed quadruple light images of equal spot intensity. In the structure shown in FIG. 3, the double refraction plates and the quarter wavelength plate are disposed between the lens system 11 and a dotted color-encoding filter element 12. It should however be noted that essentially the same action can be attained even when the double refraction plates and the quarter wavelength plate are disposed at any position along the optical axis so long as they are upstream of the mosaic color-encoding filter element 12. FIG. 4 shows schematically the quadruple images thus produced. In this figure, reference letters c and d represent deviation distances between the double images produced by the double refraction plates 1 and 2, respectively. The distances c and d vary in dependence on the thicknesses of the corresponding double refraction plates. The reference symbol $\alpha$ represents a deviation angle formed between the directions in which the light images are produced by the double refraction plates 1 and 2, respectively. In the case of the illustrated embodiment, this angle $\alpha$ is 90°. The quadruple light images of equal intensity are produced in a rectangular array symmetrically to the horizontal and the vertical.

Figure 1:
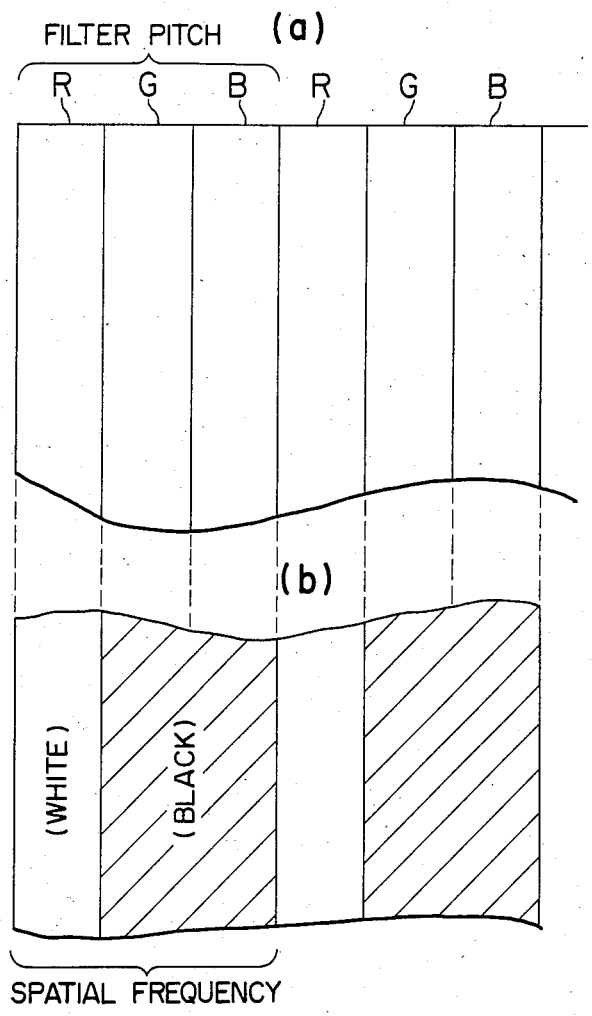
FIG. 1 is a view showing a hitherto known striped color-encoding filter together with a black and white pattern for elucidating generation of a spurious signal component.
Figure 2:
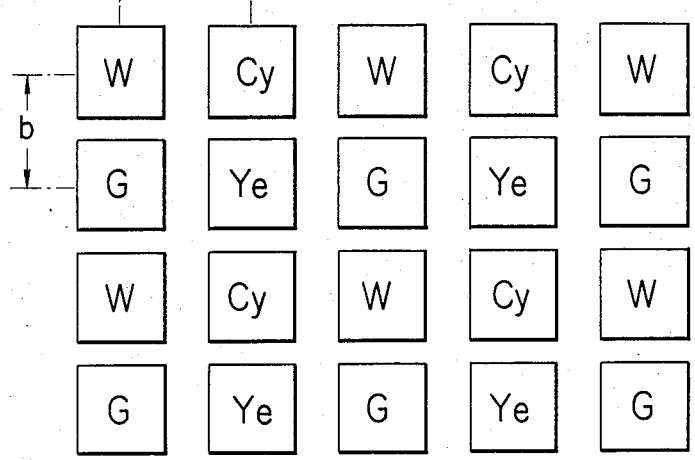
FIG. 2 is a view showing a hitherto known mosaic color-encoding filter.

The filter response with regard to the spatial frequency of the quadruple images in both horizontal and vertical directions is given by the expression (1). The trap frequency $f_0$ is a function of the filter geometry and the filter scanning rate, and the thicknesses of the double refraction plates determine the deviation distances c and d of the quadruple images. The color encoding filter 12 employed in this embodiment is of the structure shown in FIG. 2, in which the inter-dot pitch in the horizontal direction is 23 $\mu$m while the vertical inter-dot pitch is 13.5 $\mu$m. Here, attention is given to one color, such as white (W), by way of example. Since the repetition pitches of the white dot in both the horizontal and the vertical direction (i.e., the pitch at which the white dot makes an appearance in the dot array in both the horizontal and the vertical direction) are twice as great as the corresponding inter-dot pitches mentioned above, the repetition frequency of the white dots is 3.58 MHz when the dot reading or scanning operation is effected at a clock frequency of 7.16 MHz in the horizontal direction, i.e., the repetition frequency is equal to a half of the clock frequency. Accordingly, the signal component whose frequency lies in the vicinity of the spatial frequency of 3.58 MHz (corresponding to about 280 lines in television) will be admixed to a low frequency band as the spurious color signal. In the vertical direction, the spatial frequency corresponding to about 525 lines will be admixed to the low frequency band as the spurious color signal. In order to suppress these spurious color signals, the spatial frequencies lying in the vicinity of 3.58 MHz in the horizontal direction and 525 lines in the vertical direction have to be suppressed. To this end, the pair of the double refraction plates 1 and 2 are selected in thickness to be about 3.9 mm and 2.3 mm, respectively, so that the deviation distances c and d among the quadruple images as defined hereinbefore are 23 $\mu$m and 13.5 $\mu$m. Further, the direction in which the double images produced by the refraction plate 1 are deviated from each other is oriented horizontally, while the direction in which the double image produced by the double refraction plate 2 are deviated from each other is oriented vertically. The quarter wavelength plate 3 is interposed between the pair of the double refraction plates 1 and 2.

In the foregoing, the present invention has been described in connection with the suppression of the spurious signals generated due to the use of the mosaic color encoding filter, by way of example. It should however be mentioned that the teaching of the invention can also be effectively applied for suppressing the spurious signals generated in the course of the color encoding or modulation in both horizontal and vertical directions by using the striped color-encoding filter as well as other types of the mosaic color-encoding filters.

Figure 6:
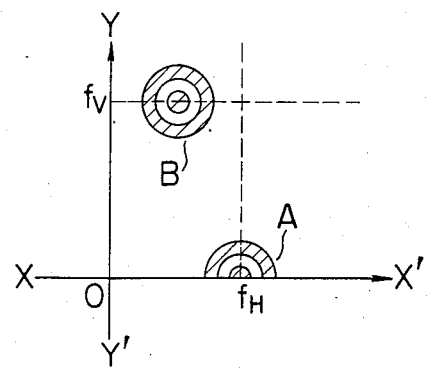
FIG. 6 is a view illustrating examples of the spurious signal generated when the zone plate is picked up.
Figure 5:
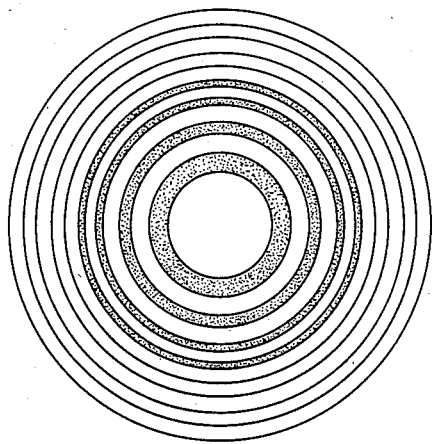
FIG. 5 is a view showing a circular zone plate diagram used for designing the spatial frequency filter so that the spurious signals are suppressed.

Next, a method of designing a spatial frequency filter in general will be described. In the first place, a simple method of determining the spatial frequency at which the spurious signal is generated will be mentioned. FIG. 5 shows a zone plate depicted with a number of coaxial circles, the pitch of each of which is in inverse proportion to the distance of the particular circle from the center of the coaxial circles so that the outer circles produce higher spatial frequencies. By picking up this pattern, such as by photographing or imaging the zone plate, the frequency at which the spurious signal is generated can be determined. For example, reference is made to FIG. 6 which shows the distribution of the spurious signals only for the first quadrant, it being understood that the other quadrants are in a symmetrical geometry therewith. In FIG. 6, the spurious signals are designated by A and B, while $f_H$ and $f_V$ represent the values of the spatial frequency in the horizontal and vertical directions, respectively, at which the spurious signals are generated. Accordingly, the spatial frequency filter is to be imparted with such characteristic that the values of the spatial frequencies lying in the vicinity of $f_H$ and $f_V$ can be trapped by correspondingly adjusting the thicknesses of the double refraction plates 1 and 2 and hence the deviation distances c and d of the double images (5; 6 and 5'; 6'), respectively.

Figure 7:
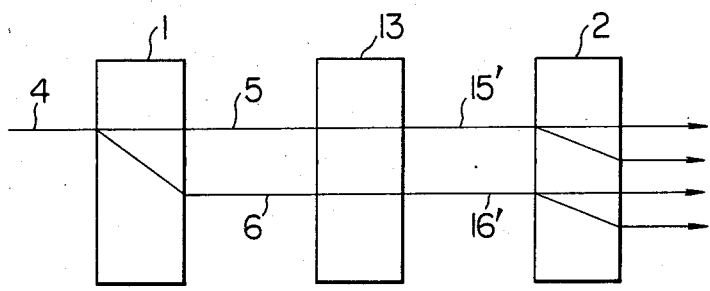
FIG. 7 is a view showing a structure of the spatial frequency filter according to another embodiment of the invention.

Next, another embodiment of the invention will be described in which the quarter wavelength plate is replaced by a rotatory polarization plate which functions to rotate the plane of polarization. FIG. 7 shows an exemplary structure in which a rotatory polarization plate for rotating the polarization plane of visible light rays for about 45° is employed. More specifically, the rotatory polarization plate 13 is interposed between a pair of double refraction plates 1 and 2 each producing double light images in the directions deviated from each other for about 90° in the same manner as described hereinbefore. The incident light ray 4 is split into the ordinary ray 5 and the extraordinary ray 6, both of which are linearly polarized light rays having vibrating planes intersecting perpendicularly to each other. The planes of polarization of these rays 5 and 6 are rotated about 45°, respectively, by the rotatory polarization plate 13 to produce light rays 15' and 16' which impinge on the double refraction plate 2 to form quadruple light images having an equal intensity in a rectangular pattern similar to the one shown in FIG. 4. The deviation distances c and d are determined in dependence on the thicknesses of the double refraction plates 1 and 2, while the angle $\alpha$ depends on the angle between the optical axes of the double refraction plates 1 and 2, respectively. In the case of the embodiment illustrated in FIG. 7, the angle of rotation of the polarization plane of light effected by the rotatory polarization plate 13 is selected at 45°, while the deviation angle between the directions of the double images split by the double refraction plates 1 and 2 is set at 90°, i.e., $\alpha$ is equal to 90°. With the structure of the dimensions mentioned above, the quadruple images are formed in a rectangular pattern of four spots having an equal spot intensity, to improve the symmetry of the spatial frequency filter. The characteristics of this spatial frequency filter are equivalent to those of the filter in which the quarter wavelength plate is employed, wherein the trap frequency in the horizontal direction is determined in dependence on the deviation distance between the light images split in the horizontal direction, while the trap frequency in the vertical direction is determined in dependence on the deviation distance between the images split in the vertical direction.

In a further embodiment of the present invention, a pseudo-depolarizing plate may be employed, which pseudo-depolarizing plate is a double refraction element capable of providing a phase difference too large to cause interference with white light or incident light having a wide wavelength band. The action of the polarization eliminator plate resides in elimination of polarization for restoring the natural light linearly polarized by the double refraction plate to the non-polarized state. Disposition of this polarization eliminator plate between the double refraction plates brings about actions and effects equivalent to those obtained when the quarter wavelength plate or the rotatory polarization plate is used.

From the foregoing, it will be understood that those spatial frequencies in both horizontal and vertical directions which give rise to generation of the spurious signals can be effectively suppressed to a satisfactory degree by virtue of the trap function realized according to the teachings of the invention.

What is claimed is:

1. An optical system for a color imaging device for introducing a plurality of rays of natural light transmitted through a lens system to a mosaic color-encoding filter, comprising: a first double refraction plate for splitting each ray of said natural light into two polarized light rays vibrating in orthogonal directions with respect to each other, an optical plate having a property to alter the state of polarization of the light rays produced by said first double refraction plate, a second double refraction plate for splitting each of the light rays altered by said optical plate into two polarized light rays vibrating in orthogonal directions with respect to each other so that quadruple light images of equal intensity arranged in a rectangular array are produced for each ray of said natural light, and a mosaic color-encoding filter positioned to receive the light rays from said second double refraction plate.

2. An optical system for a color imaging device according to claim 1, wherein said optical plate is a quarter wavelength delay plate.

3. An optical system for a color imaging device according to claim 2, wherein said quarter wavelength delay plate has an optical axis which forms an angle of 45° with the vibrating directions of the polarized light rays produced by said first double refraction plate.

4. An optical system for a color imaging device according to claim 1, wherein said optical plate is a rotatory polarization plate.

5. An optical system for a color imaging device for introducing a plurality of rays of natural light transmitted through a lens system to a mosaic color-encoding filter, comprising:
   (a) a first double refraction plate for splitting each ray of said natural light into two polarized rays vibrating in two directions orthogonal to each other,
   (b) an optical plate having a property to alter the state of polarization of the light rays produced by said first double refraction plate,
   (c) a second double refraction plate for splitting each of the light rays altered by said optical plate into two polarized light rays vibrating in two directions orthogonal to each other to obtain quadruple images arranged in a rectangular array of predetermined pitch corresponding to each ray of said natural light, and
   (d) a mosaic color-encoding filter having a plurality of sets of four color units, said four color units being arranged in a rectangular array having the same pitch as the rectangular array of said quadruple images, for receiving said polarized light rays forming said quadruple images.

6. An optical system for a color imaging device according to claim 5, wherein said optical device is a quarter wavelength delay plate.

7. An optical system for a color imaging device according to claim 6, wherein said quarter wavelength delay plate has an optical axis which forms an angle of 45° with the vibrating directions of the polarized light rays produced by said first double refraction plate.

8. An optical system for a color imaging device according to claim 5, wherein said optical plate is a rotatory polarization plate.

9. An optical system for a color imaging device according to claim 5, wherein said optical plate is a pseudo-depolarizing plate.

10. An optical system for a color imaging device for introducing a plurality of rays of natural light transmitted through a lens system to a mosaic color-encoding filter, comprising: a first double refraction plate for splitting each ray of said natural light into two polarized light rays vibrating in orthogonal directions with respect to each other, an optical plate having a property to alter the state of polarization of the light rays produced by said first double refraction plate, a second double refraction plate for splitting each of the light rays altered by said optical plate into two polarized light rays vibrating in orthogonal directions with respect to each other so that quadruple light images arranged in a rectangular array are produced for each ray of said natural light, and a mosaic color-encoding filter positioned to receive the light rays from said second double refraction plate.

11. An optical system for a color imaging device according to claim 10, wherein said optical plate is a pseudo-depolarizing plate.

* * * * *